(12) United States Patent
Dunn et al.

(10) Patent No.: US 7,246,573 B2
(45) Date of Patent: Jul. 24, 2007

(54) CURRY BRUSH FOR GROOMING AN ANIMAL

(75) Inventors: Steven B. Dunn, Beverly Hills, CA (US); Kevin Johnson, Los Angeles, CA (US); Mark Hatherill, Manhattan Beach, CA (US); Kevin C. Clark, Los Angeles, CA (US)

(73) Assignee: Munchkin, Inc., North Hills, CA (US)

( * ) Notice: Subject to any disclaimer, the term of this patent is extended or adjusted under 35 U.S.C. 154(b) by 0 days.

(21) Appl. No.: 10/962,642

(22) Filed: Oct. 12, 2004

(65) Prior Publication Data

US 2006/0102094 A1    May 18, 2006

(51) Int. Cl.
  *A01K 7/00*    (2006.01)
(52) U.S. Cl. ..................................... 119/632
(58) Field of Classification Search ................ 119/632, 119/614, 633; 15/160, 180; D4/114; 132/112, 132/115, 149, 114
See application file for complete search history.

(56) References Cited

U.S. PATENT DOCUMENTS

| | | | |
|---|---|---|---|
| 1,607,674 A * | 11/1926 | Ives ........................... | 132/114 |
| 2,430,303 A * | 11/1947 | Ruhl ........................... | 119/632 |
| 4,055,195 A * | 10/1977 | Moses ........................ | 132/115 |
| 4,543,913 A | 10/1985 | Wilkeson | |
| 4,958,596 A | 9/1990 | Belan | |
| D320,292 S * | 9/1991 | Bartlett ....................... | D4/114 |
| D330,249 S * | 10/1992 | Mitchell ....................... | D4/114 |
| 5,297,882 A * | 3/1994 | Kornides ..................... | 132/112 |
| D357,810 S * | 5/1995 | Evans .......................... | D4/114 |
| 5,449,006 A * | 9/1995 | Hogan et al. ................. | 132/112 |
| 5,485,807 A | 1/1996 | Bertwell et al. | |
| 5,746,531 A * | 5/1998 | Izhak .......................... | 132/112 |
| 6,145,513 A * | 11/2000 | Chu et al. .................... | 132/112 |
| 6,269,514 B1 * | 8/2001 | Edwards et al. ........... | 15/159.1 |
| 6,325,070 B1 | 12/2001 | Tyroler et al. | |
| D477,917 S * | 8/2003 | Giacolo et al. ............. | D4/114 |
| D510,191 S * | 10/2005 | Glover ........................ | D4/114 |
| 2003/0209210 A1* | 11/2003 | Plante et al. ................ | 119/625 |

\* cited by examiner

*Primary Examiner*—Thomas Price
(74) *Attorney, Agent, or Firm*—Knoble Yoshida & Dunleavy LLC

(57) ABSTRACT

A curry brush for grooming an animal includes a flexible, elastomeric body portion that has a socket defined therein for receiving a relatively rigid container. A plurality of flexible tines extend outwardly from the body portion. The container may be removed from the socket when desired for purposes such as refilling and/or cleaning and is preferably used to store a liquid such as shampoo. The container provides added longitudinal stiffness to the curry brush but permits a limited flexure to occur that is advantageous to a user both in gripping the curry brush and in controlling the curry brush during grooming.

24 Claims, 6 Drawing Sheets

CURRY BRUSH FOR GROOMING AN ANIMAL

BACKGROUND OF THE INVENTION

1. Field of the Invention

This invention relates generally to the field of animal care and grooming. More specifically, this invention relates to a flexible elastomeric curry brush that provides added convenience, better gripping and improved control during grooming with respect to conventional curry brushes.

2. Description of the Related Technology

Consumers and animal professionals have a wide variety of grooming tools to choose from, and frequently acquire large collections of brushes, combs, shampoo containers, flea and tick powders, clippers, scissors and other equipment, particularly if they are responsible for the care of more than one animal.

One type of grooming brush that is effective in caring for the coat of certain pets, such as cats and dogs, is the rubber curry brush. These implements typically have a handle and a plurality of flexible, elastomeric tines that are effective in removing loose hair and dirt from the animal's coat, while simultaneously having a massaging effect on the animal's skin during use. Massaging stimulates the skin, releasing natural oils, leading to a healthier skin and coat. Curry brushes can also be used while shampooing the animal.

A grooming implement such as a curry brush is only as effective as it can be gripped and controlled by the consumer. In general, a certain amount of flexibility in such brushes tends to improve the quality of the grip that can be achieved by the user, but too much flexibility can result in unwanted distortion of the overall shape of the implement, which has the unwanted effect of reducing control.

It is also difficult for many pet owners and pet professionals to control a restless pet during shampooing while simultaneously keeping track of the various tools and supplies that may be needed for the process, such as shampoo containers and grooming implements.

A need exists for an improved flexible curry brush that provides for enhanced grippability without sacrificing controllability, and that also helps the pet owner remain neat and organized while attending to grooming of the animal.

SUMMARY OF THE INVENTION

Accordingly, it is an object of the invention to provide an improved flexible curry brush that provides enhanced grippability for the consumer without sacrificing controllability. It further is an object of the invention to provide a curry brush that assists the pet owner in remaining neat and organized while attending to grooming of the animal.

In order to achieve the above and other objects of the invention, a curry brush for grooming an animal according to a first aspect of the invention includes a body portion having a socket defined therein; a plurality of flexible tines extending from the body portion; and a container positioned within the socket.

According to a second aspect of the invention, a brush for grooming an animal includes a flexible body portion having a socket defined therein; a plurality of tines extending from the body portion; and a container positioned within the socket, and wherein the container provides added rigidity to the flexible body portion.

According to a third aspect of the invention, a brush for grooming an animal includes a flexible body portion having a socket defined therein for receiving a container; a plurality of tines extending from the body portion; and a viewing window defined in the flexible body portion to permit a person to view the container when it is positioned in the socket, and wherein the viewing window is configured to have a pet related design configuration.

These and various other advantages and features of novelty that characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

DETAILED DESCRIPTION OF THE PREFERRED EMBODIMENT(S)

Figure 1:
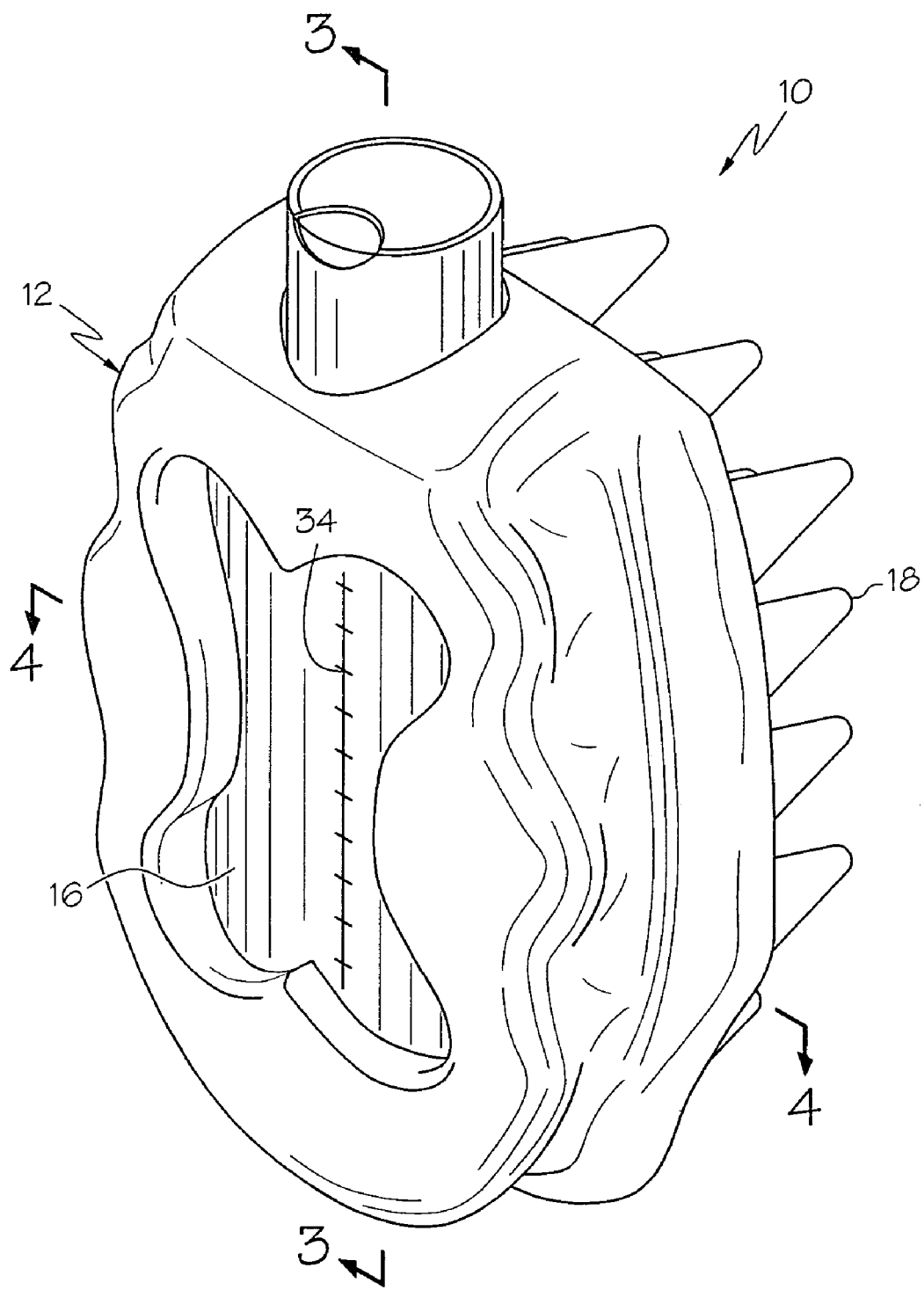
FIG. 1 is an isometric view of a curry brush that is constructed according to a preferred embodiment of the invention.
Figure 2:
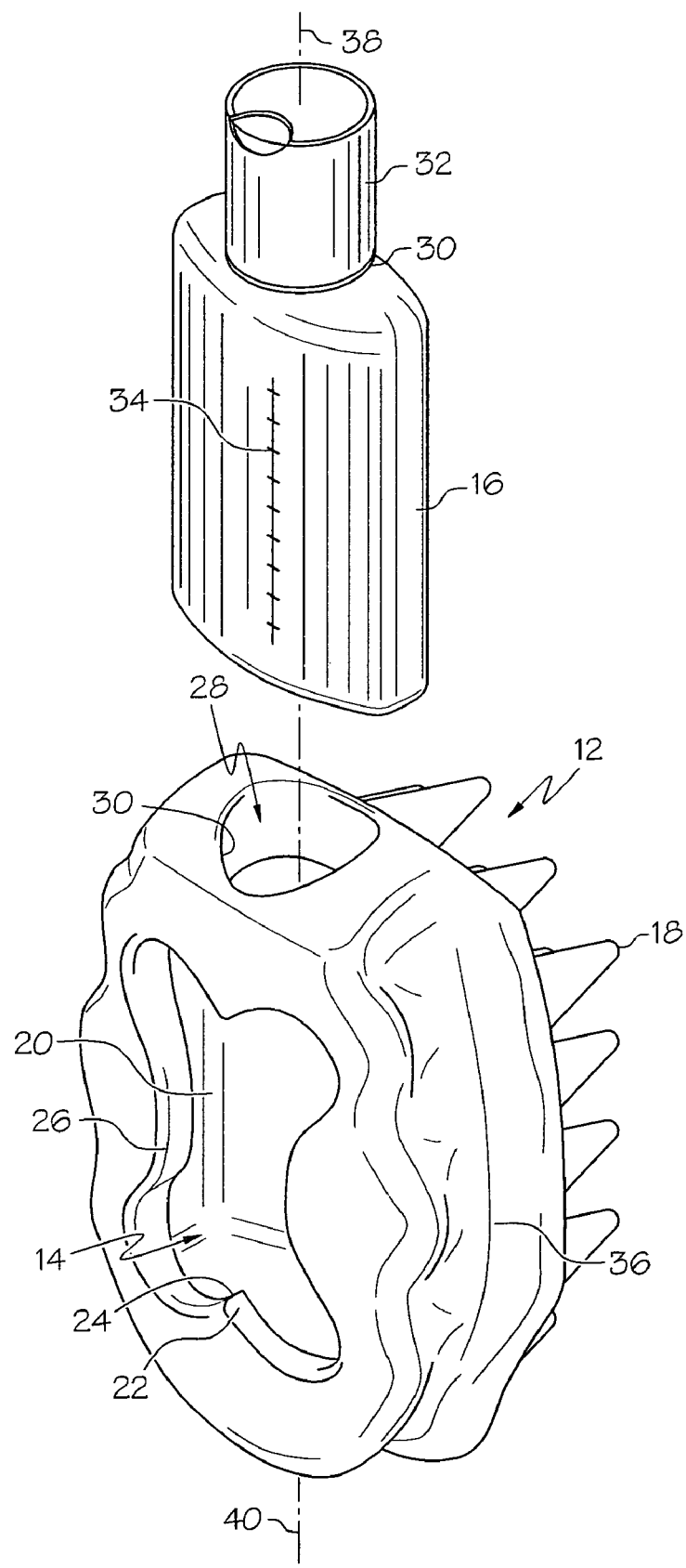
FIG. 2 is an isometric exploded view of the curry brush that is shown in FIG. 1.
Figure 3:
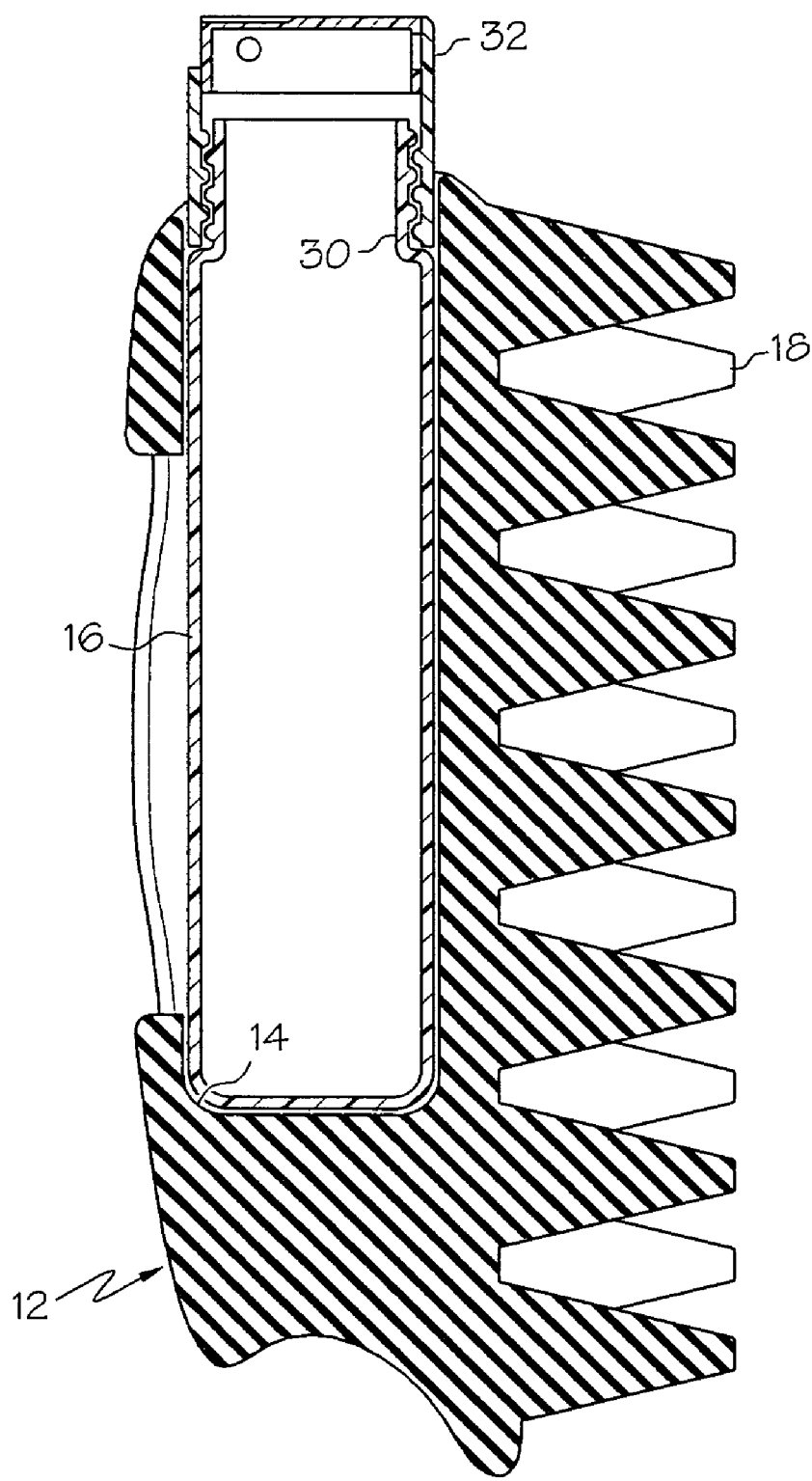
FIG. 3 is a cross-sectional view taken along lines 3-3 in FIG. 1.

Referring now to the drawings, wherein like reference numerals designate corresponding structure throughout the views, and referring in particular to FIG. 1, a curry brush 10 that is constructed according to a preferred embodiment of the invention includes a body portion 12 that is preferably fabricated from a resilient, flexible, elastomeric material such as a thermoplastic elastomer resin (TPE), neoprene or other rubber-like materials. Body portion 12 preferably has a socket 14 defined therein for receiving a relatively rigid container 16, as is depicted in FIG. 2. Body portion 12 further includes a plurality of flexible tines 18 extending therefrom for grooming an animal such as a cat or dog. Each of the flexible tines 18 is preferably tapered so as to have a substantially conical shape, with the thick end being unitary with the body portion 12, as is best shown in FIG. 3. In the preferred embodiment, the entire body portion 12, including the flexible tines 18 is fabricated from a single unitary material having uniform elastomeric properties. Preferably, this material has a hardness that is within a range of about 5 Shore A to about 80 Shore A, and more preferably within a range of about 20 Shore A to about 50 Shore A. The resilient, flexible elastomeric material further preferably has a frictional coefficient that is within a range of about 0.25 to about 0.9.

Referring now to FIG. 2, it will be seen that the body portion 12 is provided with a viewing window 20 through which a consumer may view and touch the container 16. Preferably, container 16 is fabricated to be at least translucent, and preferably transparent, so that the consumer can readily ascertain how much material such as liquid is within the container 16 at any given time. It is anticipated that a liquid such as shampoo and/or conditioner will be stored within the container 16. The container 16 may be prefilled by the manufacturer of the curry brush 10 or by the consumer. Viewing window 20 is preferably sized and shaped so as to permit container 16 to be inserted and removed from the socket 14 that is defined within the body portion 12 through the viewing window 20. In the preferred embodiment, viewing window 20 is defined by a flexible edge 22 having a number of flexible projections 24, 26 that act to retain the container 16 within the socket 14 when the curry brush 10 is in use. What is desired to remove the container 16 from body portion 12 the flexible projections 24, 26 will deflect under pressure, thereby permitting removal. In the preferred embodiment, edge 22 is configured so as to define an ornamental design that is appropriate to the use of the curry brush 10, for example a dog bone styled shape. Other examples are discussed below.

A cylindrical opening 28 is defined in an end portion of the body portion 12 by a surface 30. As is the shown in FIG. 2, container 16 preferably includes a neck or finish portion 30 to which a dispensing type closure 32 is removably secured. Dispensing closure 32 is depicted as a disc type dispensing closure that is opened by depressing one side of a generally cylindrical disc. Such dispensing closures are well-known. Alternatively, the dispensing closure might be embodied as a closure of the type that has an integrated pump.

Cylindrical opening 28 is sized and oriented relative to socket 14 so as to receive the neck portion 30 and a part of the dispensing closure 32 when the container 16 is seated within socket 14. A distal end of the dispensing closure 32 will extend beyond the end of cylindrical opening 28 and protrude from the curry brush 10 so that material may be dispensed from the container 16 without removing the container 16 from the body portion 12. Additionally, dispensing closure 32 preferably extends beyond the end of cylindrical opening 28 at least to the extent that is necessary to permit the consumer to unscrew the dispensing closure 32 from the container 16, which will permit the consumer to refill the container 16 without removing the container 16 from the socket 14.

Preferably, container 16 is fabricated from a material having a hardness that is greater than a hardness of the flexible resilient elastomeric material from which body portion 12 is fabricated. Container 16 is preferably fabricated from a clear, relatively hard transparent plastic material such as polyethylene terephthalate (PET) or polycarbonate. This material preferably has a hardness that is harder than the hardness of the flexible resilient elastomeric material from which body portion 12 is fabricated, namely greater than Shore 80A, and is more preferably within a range of about Rockwell M85 to about Rockwell M95. This relatively hard plastic material also preferably has a coefficient of friction that is within a range of about 0.15 to about 0.4.

Container 16 thus provides added stiffness and rigidity to the curry brush 10 when it is positioned within the socket 14 that is defined in body portion 12. Indicia 34 is preferably provided on the container 16 for providing a quantitative indication to the consumer as to how much liquid is contained within the container 16 at any given time. Indicia 34 is preferably positioned on the container 16 in a location where it may be viewed by the consumer through the viewing window 20, as is best shown in FIG. 1.

Figure 4:
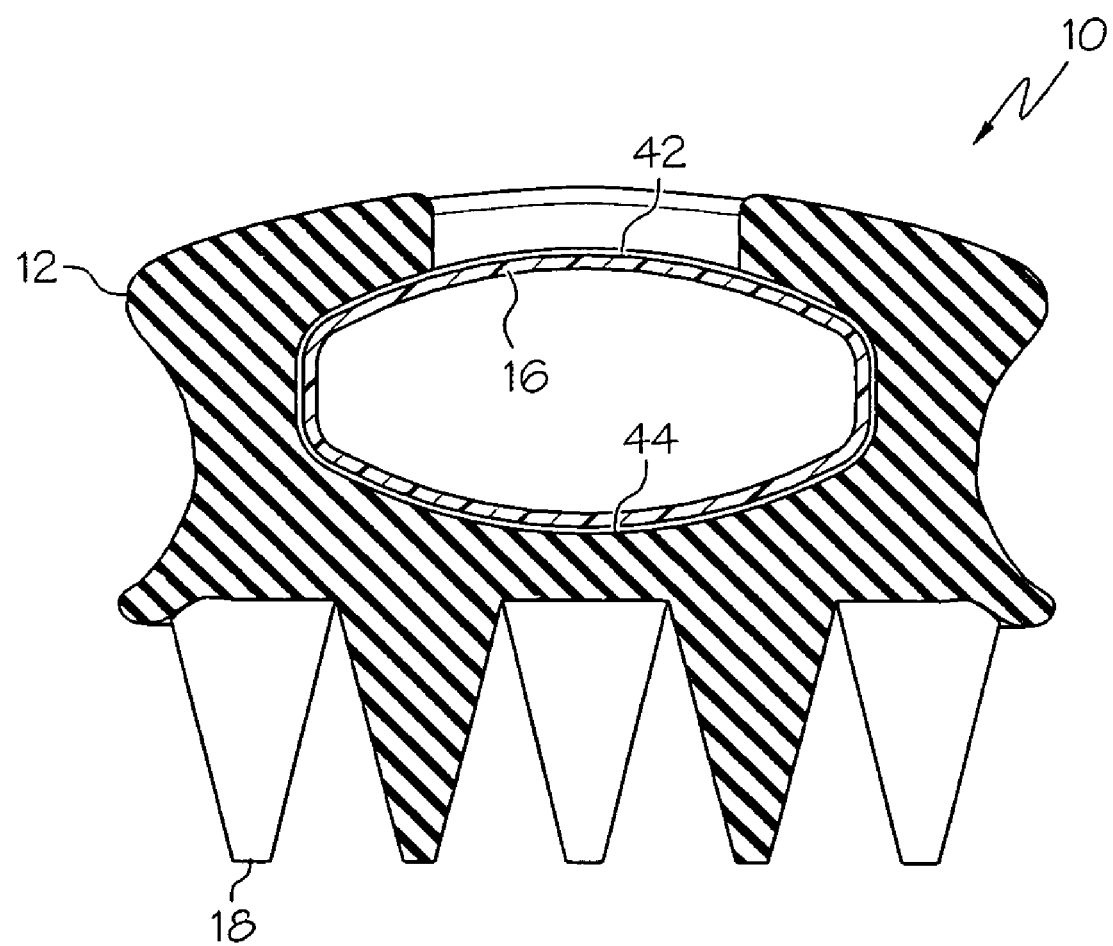
FIG. 4 is a cross-sectional view taken along lines 4-4 and FIG. 1.

Container 16 preferably has a relatively smooth outer surface 42, as is the shown in FIG. 4, and the socket 14 is preferably defined within the body portion 12 by a complementary shaped relatively smooth inner surface 44. In addition, the longitudinal axis 38 of the container 16 is preferably positioned so as to be roughly parallel with the longitudinal axis 40 of the body portion 12 when the container 16 is seated within socket 14. Contoured flexible gripping surfaces 36 are provided on first and second sides of body portion 12 and are sized and shaped to be comfortably received within the hand of the user, preferably so that one of the gripping surfaces will be positioned in contact with the users thumb while the opposing gripping surface is in contact with the user's fingers.

When the user squeezes the opposed gripping surfaces a degree of flexure of the body portion 12 will occur about the container 16, as the smooth inner surface 44 of the cavity 14 is permitted to laterally displaced by a limited amount relative to the smooth outer surface 42 of the container 16. This displacement tends to occur in a direction that is substantially perpendicular to both a radius and the longitudinal axis 38 of the container 16 or both a radius and the longitudinal axis 40 of the body portion 12, rather than in the longitudinal direction or the radial direction. In other words, container 16 provides longitudinal stiffening to the curry brush 10. The flexure that is permitted to take place, however, enhances the grippability and control that is afforded to the user. One concurrent benefit that is provided by the removable stiffening element is that it gives the user the option of removing the stiffening element during use and therefore having a grooming implement that is much more flexible and capable of tasks that it would not be with the stiffening element or container 16 positioned within the cavity 14.

Figure 5:
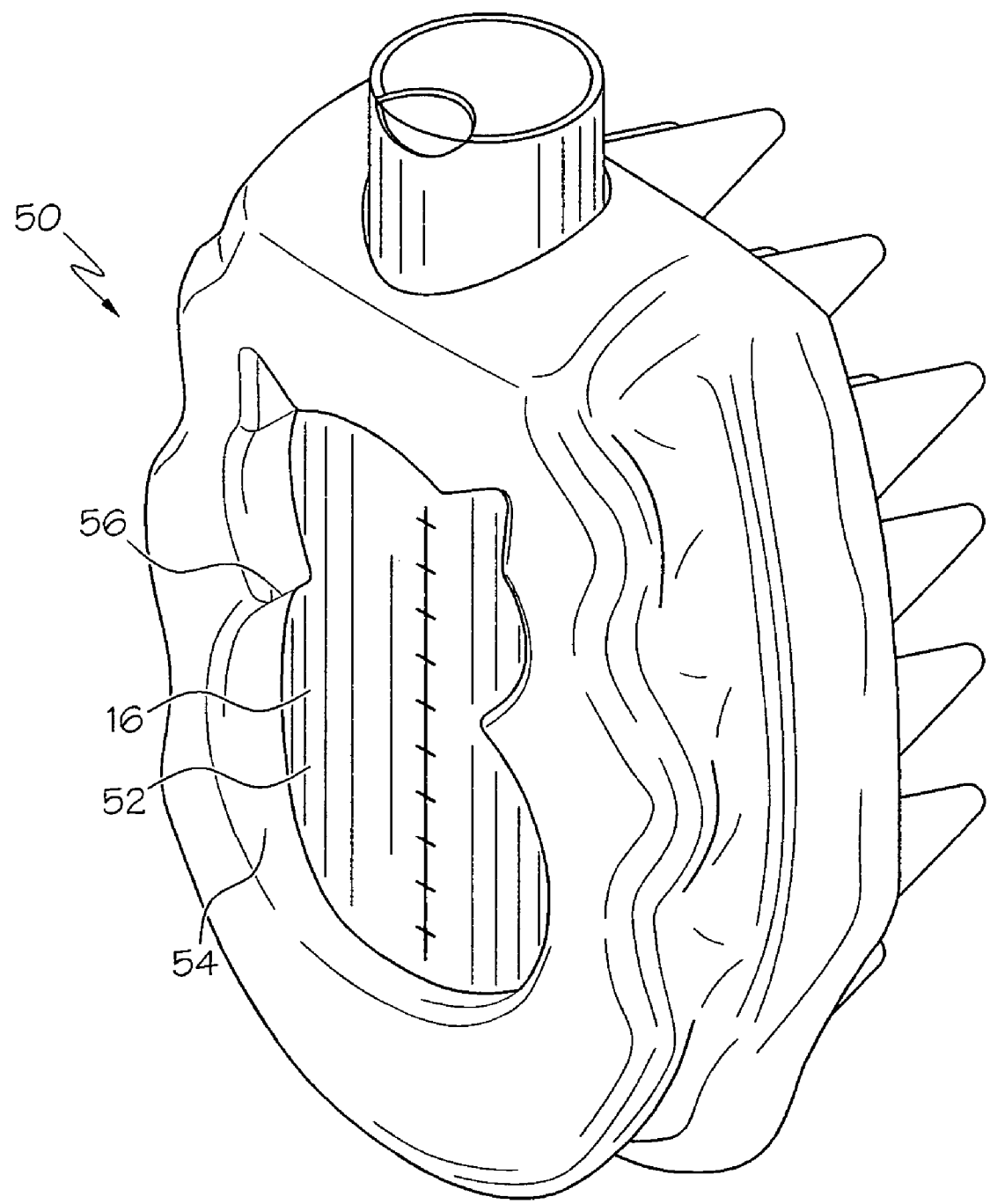
FIG. 5 is an isometric view of a curry brush that is constructed according to an alternative embodiment of the invention.

FIG. 5 is an isometric view of a curry brush 50 that is constructed according to a second alternative embodiment of the invention. This embodiment of the invention is intended specifically for the grooming of cats, and is characterized by a viewing window 52 that is stylized and shaped to resemble the feline form. Viewing window 52 is defined by a flexible edge portion 54 that includes a pair of flexible projections 56 that are integrated into the feline design. Otherwise, this embodiment of the invention is identical to that described above with reference to the first embodiment.

Figure 6:
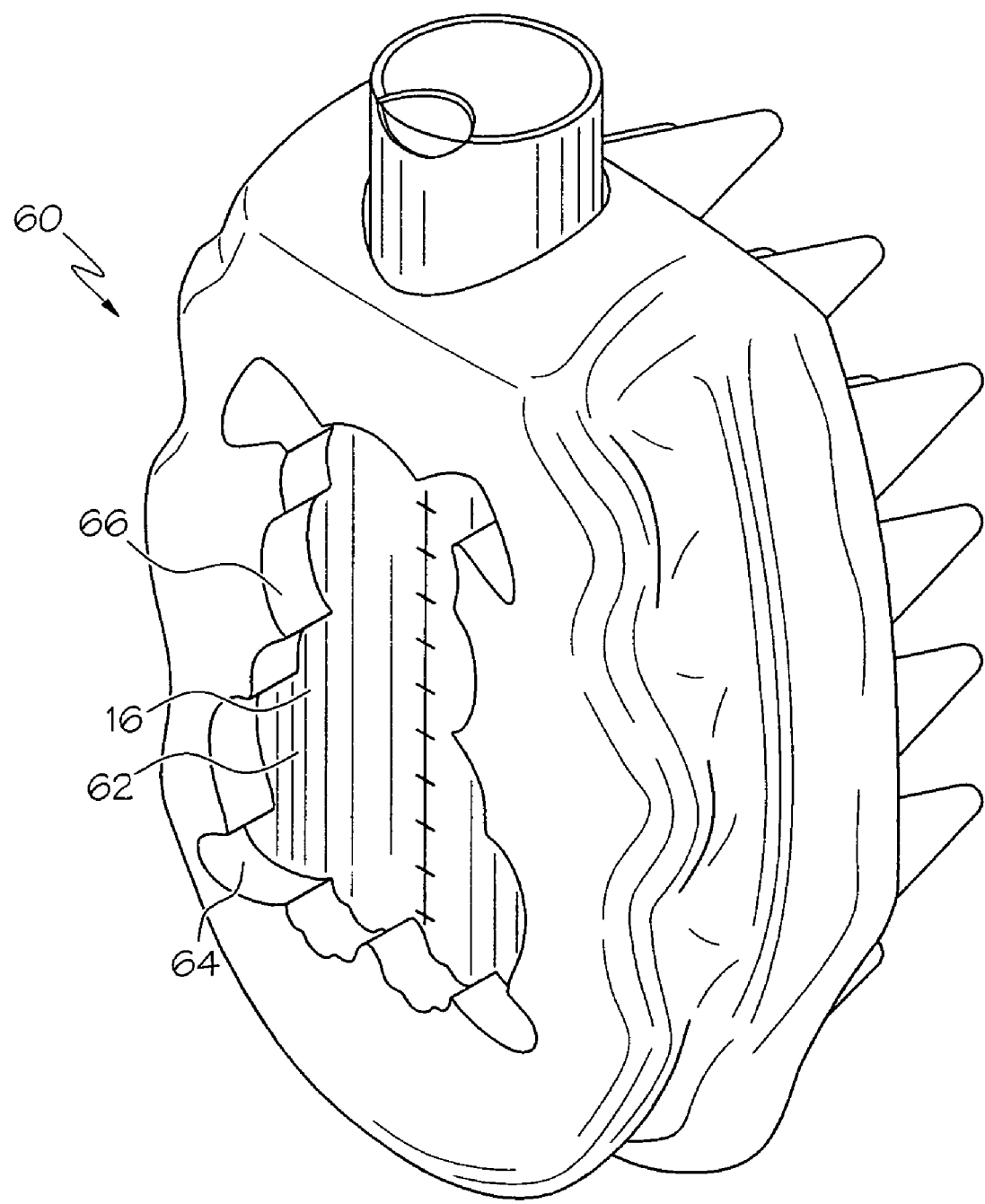
FIG. 6 is an isometric view of a curry brush that is constructed according to a second alternative embodiment of the invention.

FIG. 6 is an isometric view of the curry brush 60 that is constructed according to a third alternative embodiment of the invention. This embodiment of the invention is intended for the grooming of dogs, and is characterized by a viewing window 62 that is stylized and shaped to resemble the canine form. Viewing window 62 is defined by a flexible edge portion 64 that includes a plurality of flexible projections 66 that are integrated into the design. Otherwise, this embodiment of the invention is identical to that described above with reference to the first and second embodiments. It should be understood that these examples are exemplary only, and that a wide variety of pet related designs are possible within the intended scope of the present invention.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A curry brush for grooming an animal, comprising:
  a body portion having a socket defined therein;

a plurality of flexible tines extending from said body portion; and a container positioned within said socket, and wherein said container is fabricated from a material having a hardness that is greater than a hardness of said flexible elastomeric material, whereby said container provides added rigidity to said body portion, said container being adapted to dispense a liquid material that is disposed within said container.

2. A curry brush according to claim 1, wherein said body portion is fabricated from a flexible elastomeric material.

3. A curry brush according to claim 1, wherein said flexible tines are fabricated from a flexible elastomeric material.

4. A curry brush according to claim 1, wherein said container is removably positioned within said socket.

5. A curry brush according to claim 1, further comprising a viewing window defined in said body portion for permitting a user to view said container.

6. A curry brush according to claim 5, wherein said container is translucent, whereby a user will be able to view the contents of the container.

7. A curry brush according to claim 5, further comprising indicia for indicating how much material is in the container.

8. A curry brush according to claim 7, wherein said indicia is provided on said container.

9. A curry brush according to claim 1, wherein said body portion defines a longitudinal axis, and wherein said longitudinal axis is substantially parallel with a longitudinal axis of said container.

10. A curry brush for grooming an animal, comprising:
a body portion having a socket defined therein, said socket being at least partially defined by a flexible elastomeric material that forms a flexible edge defining a viewing window;
a plurality of flexible tines extending from said body portion; and
a container positioned within said socket, wherein, said socket and said container being configured so that a user may insert and remove said container from said socket through said viewing window.

11. A curry brush for grooming an animal, comprising:
a body portion having a socket defined therein;
a plurality of flexible tines extending from said body portion; and
a container positioned within said socket, wherein said container is adapted to dispense a liquid that is disposed within said container and includes a dispensing closure that extends outwardly from said body portion of said curry brush.

12. A curry brush according to claim 11, wherein said dispensing closure is removable from said container.

13. A brush for grooming an animal, comprising:
a flexible body portion having a socket defined therein, said entire flexible body portion being fabricated from a flexible elastomeric material having a hardness within the range of about 5 Shore A to about 80 Shore A, said flexible elastomeric material has a frictional coefficient that is within a range of about 0.25 to about 0.9;
a plurality of tines extending from said body portion; and
a container positioned within said socket, and wherein said container provides added rigidity to said flexible body portion.

14. A brush according to claim 13, wherein said tines are also fabricated from said flexible elastomeric material.

15. A brush according to claim 13, wherein said container is removably positioned within said socket.

16. A brush according to claim 13, further comprising a viewing window defined in said body portion for permitting a user to view said container.

17. A brush according to claim 16, wherein said container is translucent, whereby a user will be able to view the contents of the container.

18. A brush according to claim 17, further comprising indicia for indicating how much material is in the container.

19. A brush according to claim 18, wherein said indicia is provided on said container.

20. A brush according to claim 13, wherein said container is adapted to dispense material that is disposed within said container.

21. A brush according to claim 20, wherein said container is adapted to dispense a liquid that is disposed within said container.

22. A brush according to claim 13, wherein said body portion defines a longitudinal axis, and wherein said longitudinal axis is substantially parallel with a longitudinal axis of said container.

23. A brush for grooming an animal, comprising:
a flexible body portion having a socket defined therein;
a plurality of tines extending from said body portion; and
a container positioned within said socket, said container providing added rigidity to said flexible body portion, and wherein said container includes a dispensing closure that extend outwardly from said body portion of said curry brush.

24. A brush according to claim 23, wherein said dispensing closure is removable from said container.

* * * * *